United States Patent [19]

David et al.

[11] Patent Number: 4,859,432

[45] Date of Patent: Aug. 22, 1989

[54] NOVEL CERIC OXIDE PARTICULATES AND PROCESS OF MAKING

[75] Inventors: Claire David; Claude Magnier, both of Paris; Bertrand Latourrette, Cernay, all of France

[73] Assignee: Rhone-Poulenc Chimie, Courbevoie, France

[21] Appl. No.: 135,380

[22] Filed: Dec. 21, 1987

[30] Foreign Application Priority Data

Dec. 19, 1986 [FR] France ............................. 86 17805

[51] Int. Cl.$^4$ ........................... C01F 1/00; C01F 17/00
[52] U.S. Cl. ................................. 423/21.1; 423/263; 502/304
[58] Field of Search ............... 204/130, 96; 423/21.1, 423/263; 502/304

[56] References Cited

U.S. PATENT DOCUMENTS

| 3,024,199 | 5/1962 | Pasfield | 252/313.1 |
| 4,049,463 | 9/1977 | Hafner | 106/288 |
| 4,140,771 | 2/1979 | Berard et al. | 423/263 |
| 4,545,923 | 10/1985 | Gradeff et al. | 252/304 |
| 4,647,401 | 3/1987 | Gradeff et al. | 252/304 |
| 4,663,137 | 5/1987 | Chane-Ching et al. | 423/263 |

FOREIGN PATENT DOCUMENTS

| 597180 | 5/1960 | Canada | 423/21.1 |
| WO79/00248 | 5/1979 | World Int. Prop. O. | |

Primary Examiner—John F. Niebling
Assistant Examiner—David G. Ryser
Attorney, Agent, or Firm—Burns, Doane, Swecker & Mathis

[57] ABSTRACT

Morphologically improved ceric oxide particulates have a BET specific surface, measured after calcination at a temperature of from 350° to 450° C., of at least 100 m$^2$/g, a total pore volume of at least 0.3 cm$^3$/g, and the pores of which having a mean diameter larger than 50 Å. The improved ceric oxide particulates are prepared by reacting a cerium salt with a strong base in the presence of carboxylate ions, or a cerium carboxylate with a strong base; separating the precipitate of true cerium hydroxide thus produced; and washing, heat-treating, and calcining such precipitate.

29 Claims, 1 Drawing Sheet

PI unique
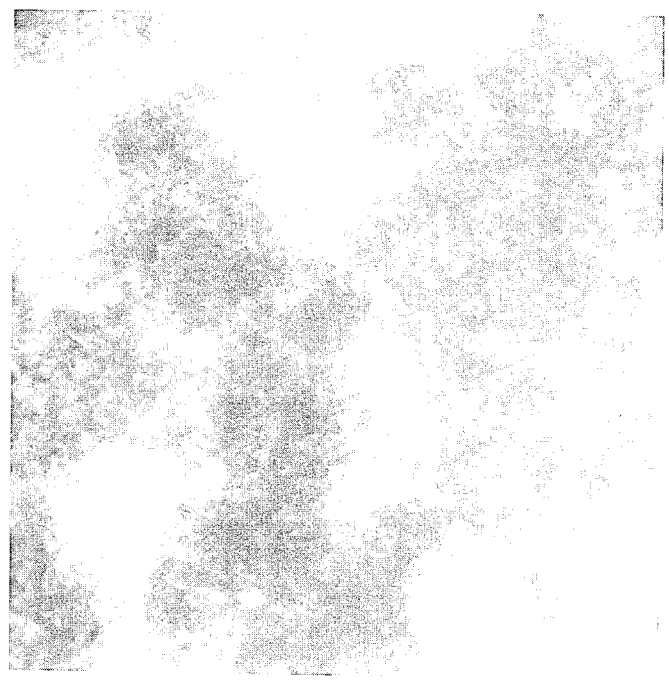
455 Å

NOVEL CERIC OXIDE PARTICULATES AND PROCESS OF MAKING

BACKGROUND OF THE INVENTION

1. Field of the Invention:

The present invention relates to novel ceric oxide particulates having improved morphological characteristics, and to a process for the production of such novel ceric oxide particulates.

As utilized herein, by the term "specific surface" is intended the BET specific surface determined by the Brunauer-Emmett-Teller method described in *Journal of the American Chemical Society*, 60, 309 (1938).

2. Description of the Prior Art:

Ceric oxide, either alone or in admixture with other metallic oxides, is known to this art, e.g., as a catalyst for the synthesis, in particular, of methanol [C. R. Seances, *Acad, Sci.*, Ser. 2, 292 (12), 883–5 (1981)] or for the treatment of residual gases (published Japanese Patent Application No. 76/62 616).

In order to exhibit good catalytic activity, it is desirable that the ceric oxide have the greatest specific surface possible.

The ceric oxide described in published French Application No. 2,559,754 has a specific surface of at least $85 \pm 5$ m$^2$/g after calcination at a temperature of from 350° to 450° C. It preferably has a specific surface of from 100 to 130 m$^2$/g after calcination at a temperature of from 400° to 450° C. This particular ceric oxide is prepared by the hydrolysis of an aqueous solution of ceric nitrate in a nitric acid medium, followed by separation of the precipitate thus formed, washing, optional drying, and then calcination at a temperature of from 300° to 600° C. The product ceric oxide has a large specific surface, but low porosity, as the micropores have an average diameter of from 10 to 20 Å and a total pore volume on the order of 0.02 cm$^3$/g.

Another ceric oxide known to the prior art (published French Application No. 2,559,755) has a specific surface of at least $85 \pm 5$ m$^2$/g after calcination at a temperature of from 350° to 500° C. and preferably a specific surface of from 150 to 180 m$^2$/g after calcination at a temperature of from 400° to 450° C. Such ceric oxide is produced by precipitating a basic ceric sulfate, by reacting an aqueous solution of ceric nitrate with an aqueous solution containing sulfate ions, separating the precipitate thus formed, washing and optionally drying it, and then calcining it at a temperature of from 300° to 500° C. The ceric oxide prepared in this manner has a large specific surface, a porosity distribution such that the pore diameters range from 10 to 200 Å, and a total pore volume of approximately 0.15 m$^3$/g. It also contains an amount of residual sulfate ions and, therefore, can only be selectively used for catalysis.

SUMMARY OF THE INVENTION

Accordingly, a major object of the present invention is the provision of novel ceric oxide particulates having a large specific surface and improved porosity characteristics, as well as good thermal stability.

Briefly, the present invention features novel ceric oxide particulates having a specific surface of at least 100 m$^2$/g after calcination at a temperature of from 350° to 450° C., a total pore volume of at least 0.3 cm$^3$/g, and the pores of which having a mean diameter larger than 50 Å.

DETAILED DESCRIPTION OF THE PREFERRED EMBODIMENTS OF THE INVENTION

More particularly according to the present invention, the specific surface measurements reported herein are in relation to a material that has been subjected to calcination for at least two hours, at the temperature given.

The total pore volume and the pore sizes are determined, as is the specific surface, by the BET method.

A first characterizing feature of the ceric oxide according to the invention is that it has a large specific surface.

The preferred ceric oxide particulates according to the invention have a specific surface ranging from 100 to 160 m$^2$/g and even more preferably a specific surface of 140 to 160 m$^2$/g after calcination at a temperature of from 400° to 450° C.

Another characterizing feature of the ceric oxide according to the invention is that it has a relatively stable specific surface over the temperature range of from 400° to 600° C.

Thus, a preferred ceric oxide still has a specific surface of from 80 to 130 m$^2$/g after calcination at 600° C. More preferably, the ceric oxide has a specific surface greater than 100 m$^2$/g, and, even more preferably, it has a specific surface of from 100 to 130 m$^2$/g, after calcination at 600° C.

Yet another characteristic of the ceric oxide of the invention is that it has a high porosity.

The total pore volume of the ceric oxide particulates according to the invention may range from 0.3 to 0.45 cm$^3$/g.

The pore sizes range from 20 to 1000 Å. The mean diameter ($d_{50}$) of the pores ranges from 50 to 200 Å.

By "mean diameter" is intended that diameter such that all of the pores smaller than this diameter constitute 50% of the total pore volume ($v_p$).

Examination by scanning electron microscopy evidences that the ceric oxide particulates are very fine grains, sized on the order of 1 μm to 5 μm, with coarse agglomerates having dimensions on the order to 20 to 50 μm also being present.

Examination by transmission electron microscopy reveals crystals of an acicular shape.

The dimensions of the needles range from 100 to 1000 Å, and most frequently are about 500 Å.

The Figure of Drawing is a transmission electron micrograph (roughly, G=220,000), which reveals the morphology of the ceric oxide to be in the form of elongated needles; said ceric oxide having been subjected to calcination at 600° C.

X-ray diffraction analysis shows that the ceric oxide of the invention has a crystalline phase of the CeO$_2$ type, with a lattice parameter ranging from 5.42 to 5.44 Å and a degree of crystallization of from 50 to 80%. In the crystallized portion, the crystallites of the ceric oxide obtained after calcination at 400° C. range in size from 40 to 100 Å.

According to this invention, the product ceric oxide contains a residual amount of an alkaline cation corresponding to the cation of the base used in the preparation thereof. The residual content of the alkaline cation generally constitutes at most 0.2% expressed by weight of the metallic cation relative to the ceric oxide.

The process for preparing the ceric oxide of the invention comprises preparing a true hydroxide of the cerium by reacting a cerium salt with a strong base in the presence of carboxylate ions, or by reacting a cerium carboxylate and a strong base, and separating the precipitate obtained, and washing and heat treating it.

By the expression "true hydroxide of cerium" is intended either cerous hydroxide $Ce(OH)_3$ or ceric hydroxide $Ce(OH)_4$, which may also be written as $CeO_2 \cdot 2H_2O$.

In the first stage of the process of the invention, the true cerium hydroxide is prepared.

One embodiment of the invention comprises precipitating the hydroxide by reacting a cerium salt with a base in the presence of carboxylate ions, which may be added in the acid form, or in the form of an alkali metal or ammonium salt.

For purposes of simplification, hereinafter all of the sources of the carboxylate ion will be designated as "carboxylic acids", whether in the acid or the salified form.

The mixture of the cerium salt and the carboxylic acid is prepared and then reacted with a base.

The cerium salt used in the process of the invention may be any cerium salt, in either the ceric or cerous form, that is soluble under the conditions of the invention.

It is also possible to use mixtures of the cerium salts in either cerous or ceric state.

Exemplary of such cerium salts, representative are cerous nitrate and cerous chloride, either in solid state or as an aqueous solution thereof.

It is also possible to use an aqueous solution of ceri-ammoniacal nitrate or ceric nitrate.

A solution of ceric nitrate may also be used which is produced by the action of nitric acid on a hydrated ceric oxide prepared in conventional manner, e.g., by the reaction of a solution of a cerous salt, for example cerous carbonate, with an ammonia solution in the presence of hydrogen peroxide.

The solution of the cerium salt is selected in a manner such that it will not contain impurities that may be transferred into the final product. It may be advantageous to use a solution of a cerium salt having a purity greater than 99%.

The concentration of the solution of the cerium salt is not a critical factor according to the invention and may vary over a broad range; a concentration of from 0.1 to 3 moles per liter is nonetheless preferred.

As the source of the carboxylate ions, any carboxylic acid that is soluble under the conditions of the invention may be employed, and in particular the aliphatic, cycloaliphatic and aromatic carboxylic acids, or mixtures thereof, may be employed. Preferably, linear or branched chain aliphatic carboxylic acids having from 1 to 10 carbon atoms are used.

Exemplary of the carboxylic acids according to the invention, formic acid, acetic acid, propionic acid and benzoic acid are representative. Acetic acid is the preferred.

The proportion of the carboxylic acid to be used relative to the cerium salt is also not critical. The molar ratio between the acid and the cerium salt, expressed in terms of $CeO_2$, may range from 1 to 10 and preferably ranges from 2 to 5.

According to the process of the invention, the mixture of the aqueous solution of the cerium salt and the carboxylic acid is reacted with a base.

The base used according to the invention is an aqueous solution of a strong base, such as, for example, sodium or potassium hydroxide. An aqueous solution of sodium hydroxide is preferably used.

The normality of the basic solution employed is also not a critical factor according to the invention; it may vary over wide limits, for example from 0.1 to 11N, but solutions having concentrations ranging from 2 to 10N are preferably employed.

The proportion between the base and the cerium salt is such that the molar ration $OH^-/Ce$, expressed as $CeO_2$, is greater than or equal to 3.0, and less than or equal to 10 ($OH^-$ represents the number of moles of $OH^-$ introduced by the base, and Ce represents the number of moles of $Ce^{III}$ and/or $Ce^{IV}$ present in the reaction medium. The limits defined are not critical, and typically are selected for economic reasons.

A final concentration of the reaction medium in cerium, expressed as $CeO_2$, advantageously ranges from 0.2 to 1 mole/liter and preferably is about 0.5 mole/liter.

The mixture of the different reagents, used in the amounts defined above, is carried out at a temperature between ambient and the reflux temperature of the reaction medium, preferably in the range of from 80° C. to the reflux temperature of the reaction medium.

The duration of the reaction is not critical. It typically ranges from 1 hr to 8 hr, preferably from 2 hr to 5 hr.

The mixture of the above reagents may be carried out according to any one of a number of several variants. For example, the mixture of the aqueous solution of the cerium salt and the carboxylic acid with the basic solution may be carried out simultaneously, under agitation, or the base may be added continuously batchwise or to said mixture, or vice versa.

Another embodiment for carrying out the invention comprises precipitating a true cerium hydroxide by reacting a cerium (III) or (IV) carboxylate with a base.

Exemplary of such cerium carboxylates, any cerium carboxylate may be used that is soluble under the conditions of the invention and in particular those derived from a carboxylic acid selected from among the aliphatic, cycloaliphatic and aromatic carboxylic acids, and mixtures thereof. Preferably, linear or branched chain aliphatic carboxylic acids having 2 to approximately 18 carbon atoms, are used.

Exemplary of the cerium (III) carboxylates, cerous acetate, 2-ethylhexanoate, neodecanoate, and stearate are represenative.

As the cerium carboxylates are typically in the solid state, they are preferably added to the basic aqueous solution.

The proportions of the reagents and the conditions for carrying out the process remain identical with those described above.

In a preferred embodiment of the invention, in the case where the precipitation of the cerium hydroxide is carried out in the cerous state, it is preferable, regardless of the variant, to oxidize it into the ceric state by the addition of an oxidizing agent compatible with the reaction medium upon completion of the precipitation.

As specific examples of suitable oxidants, the following are particularly representative: solutions of sodium, potassium or ammonium perchlorate, chlorate, hypochlorite, persulfate, hydrogen peroxide, air, oxygen, ozone. The cerium may also be oxidized by electrochemical means. Hydrogen peroxide is preferably used.

The proportion of the oxidizing agent relative to the cerous salt to be oxidized may vary over wide limits. It is typically greater than the stoichiometric amount and preferably constitutes a stoichiometric excess of from 10 to 40%.

The reaction mixture is subsequently maintained at a temperature of from 10° to 95° C., and more particularly, from 50° to 70° C. for a duration that also may vary over wide limits and preferably from 5 min to 5 hr.

The cerium hydroxide precipitate may be separated from the reaction medium by the usual separation methods: filtration, decantation, centrifuging or draining.

The separation is typically carried out at ambient temperature.

The precipitate is then subjected to a washing operation.

The washing is preferably with water. More preferably, deionized or distilled water is used.

It is also possible to carry out the washing operations using a dilute solution of an acid, for example nitric acid, at a pH of from 3.0 to 5.5.

Such a wash may either replace or follow a washing with water, or conversely.

In the case wherein a cerium carboxylate is used, the carboxylate corresponding to the cation of the base is in an insoluble form, together with the cerium hydroxide, and it may be advantageous to conduct the washing operation with the aid of an organic solvent that solubilizes the carboxylate corresponding to the cation of the base. For example, an alcohol may thus be used, such as methanol, ethanol, n-propanol, isopropanol and aldehydes, or a ketone, for example acetone.

One of several washings, and most typically 1 to 2 washes, are carried out.

A preferred embodiment of the washing operation comprises placing the separated precipitate in suspension in water, in a proportion of, for example, 100 to 300 g/l.

After the wash, the precipitate is separated by the aforementioned conventional methods.

The free water content of the separated precipitate ranges from 20 to 80%, and preferably from 20 to 50%.

The product obtained after separation and washing may then be dried in air, or under a reduced pressure on the order of $10^{-2}$ to 100 mm mercury (133.322 Pa to 13,332.2 Pa.). The temperature of the drying operation may range from ambient to 100° C. and the duration of drying, while not critical, advantageously ranges from 2 to 48 hr, and preferably from 10 to 24 hr.

According to the last stage of the process according to the invention, the dried product is calcined at a temperature of from 300° to 800° C., but preferably from 350° to 600° C. The duration of calcination ranges from approximately 30 min to 24 hr, and preferably 4 to 8 hr.

The lower limit of this temperature range is not critical and may even be lowered.

In contrast, there is no technical reason to raise the upper limit of the temperature of calcination, as then a decrease in the specific surface of the product ceric oxide occurs.

The ceric oxides produced according to the invention may be used in numerous applications. Use as fillers, washcoats, thickeners, dispersants, reinforcements, pigments, adsorbents and the raw materials for the manufacture of ceramics, are representative.

The ceric oxide according to the invention has a large specific surface, such that it is eminently suited for use in the field of catalysis, whether as catalyst per se, or as the catalytic support.

In order to further illustrate the present invention and the advantages thereof, the following specific examples are given, it being understood that same are intended only as illustrative and in nowise limitative. In said examples to follow, all parts and percentages are given by weight.

EXAMPLE 1

The ceric hydroxide of this example was prepared in a reactor having a useful capacity of 500 cm$^3$, equipped with a double jacket, in which circulating water was controlled at the desired temperature, and with agitating means, together with a system for the introduction of the reagents.

At 20° C., 1,000 cm$^3$ of an aqueous solution of 4.25N sodium hydroxide were introduced into the reactor.

Over 20 min, a mixture consisting of 175 cm$^3$ of an aqueous solution of cerous nitrate at a concentration of 2.85 moles/liter and 150 g of concentrated 17.5N acetic acid were then added.

Mixing was carried out at 20° C. under an agitation of 600 rpm.

The reaction temperature was raised to 90° C. and was maintained at this level for 3 hr.

The reaction mixture was an aqueous suspension of cerous hydroxide that was permitted to cool to ambient temperature.

Subsequently, 38 cm$^3$ of hydrogen peroxide, 110 volumes, were added (9.8 moles/liter); this represented a stoichiometric excess of 50%.

The reaction mixture was maintained at 70° C. for approximately 1 hr.

The ceric hydroxide precipitate was separated on a Buchner filter (porosity No. 3).

The recovered precipitate was washed twice with water by suspending, in water, 100 g precipitate per liter of water, and a third wash was then carried out by suspending the precipitate in a dilute solution of nitric acid at pH 3.

After filtering, the precipitate collected was dried in an oven at 100° C. for 24 hr.

89 g of a product containing 92% CeO$_2$ were obtained; this represented a reaction yield of 95%.

The dried material was placed into an alumina boat and calcined in a muffle furnace for 6 hr at 400° C.

The morphology of the resulting ceric oxide is shown in FIG. 1 (G=220,000).

A crystallite size of 45 Å was determined by X-ray diffraction analysis.

The BET porosimetric analysis revealed:

(i) a specific surface on the order of 145 m$^2$/g;

(ii) a volume of pores having diameters less than 1,000 Å equal to 0.42 cm$^3$/g (the porosity appeared to be essentially intergranular porosity);

(iii) a volume of pores having diameters less than 200 Å equal to 0.32 cm$^3$/g;

(iv) a pore size distributed over 20 to 1,000 Å;

(v) a mean diameter of the pores of 190 Å;

(vi) a proportion of residual sodium of 0.16%.

EXAMPLE 2

The procedure of Example 1 was repeated, except that the calcining temperature was 600° C. instead of 400° C.

A ceric oxide having a specific surface of 95 m$^2$/g and a crystallite size of 55 Å was obtained.

EXAMPLE 3

Into an apparatus such as that described in Example 1, at 20° C., 1,000 cm$^3$ of a 4.36N aqueous sodium hydroxide solution were introduced.

Over 20 min and under agitation, 227 cm$^3$ of an aqueous solution of ceric nitrate at a concentration of 2.2 moles/liter and 150 g concentrated 17.5N acetic acid were added.

The reaction temperature was raised to 90° and maintained for 3 hr.

The reaction mixture was an aqueous suspension of ceric hydroxide and it was permitted to cool to ambient temperature.

The formed precipitate was separated by filtration on a Buchner filter (porosity No. 3).

Two water washes of the recovered precipitate were carried out by suspending, in water, 100 g of precipitate per liter of water, and a third wash was effected by means of an aqueous solution of dilute nitric acid at pH 4.5.

After filtering, the collected solid was dried for 24 hr at 100° C., then calcined for 6 hr at 400° C.

A ceric oxide having a specific surface on the order of 130 m$^2$/g and a mean pore diameter of approximately 180 Å, containing 0.15% of residual sodium, was obtained.

EXAMPLE 4

The ceric oxide was prepared according to the method described in Example 3, but the 150 g of concentrated acetic acid were replaced by 115 g concentrated formic acid.

The BET analysis of the product ceric oxide revealed:
(i) a specific surface on the order of 125 m$^2$/g;
(ii) a residual sodium content of 0.12%.

EXAMPLE 5

The procedure of Example 4 was repeated, except that the calcination was carried out at 600° C. instead of 400° C.

A ceric oxide having a specific surface on the order of 91 m$^2$/g was obtained.

EXAMPLE 6

The ceric oxide was produced according to the method described in Example 3, except that the 150 g concentrated acetic acid were replaced by 185.2 g concentrated formic acid.

The BET analysis of the product ceric oxide revealed:
(i) a specific surface on the order of 128 m$^2$/g;
(ii) a pore volume of approximately 0.39 cm$^3$/g;
(iii) a mean pore diameter of 170 Å;
(iv) a residual sodium content of 0.12%.

EXAMPLE 7

The procedure of Example 6 was repeated, except that the calcination was carried out at 600° C. instead of 400° C.

A ceric oxide having a specific surface on the order of 99 m$^2$/g was obtained.

EXAMPLE 8

A ceric oxide was produced according to the method described in Example 1, except that the starting mixture was 179 cm$^3$ of an aqueous cerous nitrate solution, at a concentration of 2.85 moles/liter, and 305.3 g benzoic acid.

After calcination at 400° C., a ceric oxide having a specific surface of 107 m$^2$/g was obtained.

EXAMPLE 9

In this example, a cerium hydroxide was precipitated by reacting a base with cerous acetate.

The cerous acetate was prepared beforehand, by the addition, in small fractions, of 236 g ammonium acetate having a concentration of 2.85 moles/liter into 350 cm$^3$ of an aqueous solution of cerous nitrate having a concentration of 1 mole/liter. Admixing was carried out at ambient temperature and under agitation, which was maintained for 20 min. A precipitate was recovered (with a yield of 81%) by filtration on a Buchner filter.

The precipitate was then dried in an oven for 20 hr at 100° C.

Into an apparatus such as that described in Example 1, at 20° C., 1,250 cm$^3$ of an aqueous solution of 5N sodium hydroxide were introduced, and then, over 15 min, 397 g cerous acetate were added thereto, in the solid state.

The admixture was carried out at 20° C. and under an agitation of 500 rpm.

The reaction temperature was raised to 80° C. and this temperature was maintained for 4 hr.

The mixture was permitted to cool to ambient; it consisted of an aqueous suspension of cerous hydroxide.

Subsequently, 95.4 cm$^3$ of hydrogen peroxide, 110 volumes (9.8 moles/liter), were added, this represented a stoichiometric excess of 50%.

The reaction mixture was maintained at 70° for approximately 1 hr.

The ceric hydroxide precipitate was separated by Buchner filtration (porosity No. 3).

Two water washes of the recovered precipitate were effected by placing 100 g of the precipitate in suspension per liter of water, and a third wash was conducted by placing the precipitate in suspension in a dilute nitric acid solution at pH 5.

After filtering, the collected solid was dried in an oven at 100° C. for 24 hr.

The dried material was placed into an alumina boat and calcined in a muffle furnace for 6 hr at 400° C.

243 g of a product containing 88.6% CeO$_2$ were obtained, representing a yield of 100%.

The BET porosimetric analysis revealed:
(i) a specific volume on the order of 148 m$^2$/g;
(ii) a volume of pores with diameters less than 1,000 Å equal to 0.39 cm$^3$/g,
(iii) a volume of pores with diameters less than 200 Å equal to 0.27 cm$^3$/g;
(iv) a pore size distribution of 20 to 1,000 Å, with the apparent porosity being both intergranular and intragranular;
(v) a mean diameter of the pores of 80 Å.

EXAMPLE 10

The procedure of Example 9 was repeated, except that the calcining temperature was 600° C. instead of 400° C.

A ceric oxide having a specific surface of 117 m$^2$/g was obtained.

EXAMPLE 11

In the following example, the cerous hydroxide was precipitated by reacting a base with cerous stearate.

The reaction was carried out according to the procedure of Example 9, but using 49.4 g cerous stearate and 1,000 cm³ of a 0.5N aqueous sodium hydroxide solution.

After maintaining the reaction mixture at 80° C. for 4 hr, it was permitted to cool. It then contained cerium hydroxide and sodium stearate.

The mixture solidified during cooling and was subsequently treated with 1,000 cm³ ethanol.

The mixture was heated to boiling, which made it possible to solubilize the sodium stearate, which was then separated from the ceric hydroxide precipitate by Buchner filtration.

The recovered precipitate was washed in water, dried and then calcined at 400° C. for 6 hr.

A ceric oxide having a specific surface on the order of 140 m²/g and a mean pore diameter of approximately 75 Å was obtained.

EXAMPLE 12

The procedure of Example 11 was repeated, except that the calcination was carried out at 600° C. instead of 400° C.

A ceric oxide having a specific surface on the order of 110 m²/g was obtained.

While the invention has been described in terms of various preferred embodiments, the skilled artisan will appreciate that various modifications, substitutions, omissions, and changes may be made without departing from the spririt thereof. Accordingly, it is intended that the scope of the present invention be limited solely by the scope of the following claims, including equivalents thereof.

What is claimed is:

1. Ceric oxide particulates having a specific surface, after calcination at a temperature of from 350° to 450° C., of at least 100 m²/g, a total pore volume of at least 0.3 cm³/g, and the pores of which having a mean diameter larger than 50 Å.

2. The ceric oxide particulates as defined by claim 1, having a specific surface of from 100 to 160 m²/g after calcination at a temperature of from 400° to 450° C.

3. The ceric oxide particulates as defined by claim 2, having a specific surface of from 140 to 160 m²/g.

4. The ceric oxide particulates as defined by claim 1, having a relatively stable specific surface over the temperature range of from 400° to 600° C.

5. The ceric oxide particulates as defined by claim 1, having a total pore volume of from 0.3 to 0.45 cm³/g.

6. The ceric oxide particulates as defined by claim 1, having a pore diameter of from 20 to 1,000 Å.

7. The ceric oxide particulates as defined by claim 6, having a mean pore diameter of from 50 to 200 Å.

8. The ceric oxide particulates as defined by claim 1, comprising a fraction of acicular crystals.

9. The ceric oxide particulates as defined by claim 8, said crystalline fraction comprising needles having dimensions ranging from 100 to 1,000 Å.

10. The ceric oxide particulates as defined by claim 1, having a maximum residual amount of alkali cations of 0.2% by weight of $CeO_2$.

11. A process for the preparation of the ceric oxide particulates as defined by claim 1, comprising either reacting a cerium salt with a strong base in the presence of carboxylate ions, or a cerium carboxylate with a strong base, separating a precipitate of true cerium hydroxide thus produced, and washing and heat-treating such precipitate.

12. The process as defined by claim 11, comprising reacting a cerium salt with the base in the presence of carboxylate ions.

13. The process as defined by claim 11, said cerium salt comprising a cerous or ceric salt, or mixture thereof, that is soluble under the conditions of the reaction.

14. The process as defined by claim 13, said cerium salt comprising cerous nitrate or cerous chloride either in solid state or in the form of an aqueous solution thereof.

15. The process as defined by claim 13, said cerium salt comprising an aqueous solution of ceri-ammoniacal nitrate or ceric nitrate.

16. The process as defined by claim 11, said cerium salt comprising an aqueous solution of a cerium (IV) salt resulting from the electrochemical oxidation of cerous nitrate, or from the action of nitric acid on a hydrated ceric oxide.

17. The process as defined by claim 11, wherein the concentration of the solution of the cerium salt ranges from 0.1 to 3 moles per liter.

18. The process as defined by claim 11, said carboxylate comprising an aliphatic, cycloaliphatic or aromatic carboxylate, or mixture thereof.

19. The process as defined by claim 11, wherein the molar ratio between the carboxylate and the cerium salt expressed as $CeO_2$, ranges from 1 to 10.

20. The process as defined by claim 11, comprising reacting a cerium (III) or (IV) carboxylate with a strong base.

21. The process as defined by claim 11, wherein the proportion between the base and the cerium salt is such that the molar ratio $OH^-/Ce$, expressed as $CeO_2$, is greater than or equal to 3.0 and less than or equal to 10.

22. The process as defined by claim 11, comprising precipitating a cerium (III) hydroxide and adding an oxidizing agent compatible with the reaction medium thereto.

23. The process as defined by claim 11, comprising washing the separated precipitate with water, with a dilute solution of an acid at a pH of from 3.0 to 5.5, or with an organic solvent solubilizing the carboxylate corresponding to the cation of the base.

24. The process as defined by claim 11, comprising drying the separated precipitate in air or under a reduced pressure at a temperature ranging from ambient to 100° C.

25. The process as defined by claim 24, comprising calcining the dried precipitate at a temperature of from 300° to 800° C.

26. The process as defined by claim 25, comprising calcining the dried precipitate at a temperature of from 350° to 600° C.

27. Ceric oxide particulates having a specific surface, after calcination at a temperature of 600° C., of from 80 to 130 m²/g, a total pore volume of at least 0.3 cm³/g, and the pores of which having a mean diameter larger than 50 Å.

28. The ceric oxide particulates as defined by claim 27, having a specific surface greater than 100 m²/g after calcination at 600° C.

29. The ceric oxide particulates as defined by claim 27, having a specific surface of from 100 to 130 m²/g after calcination at 600° C.

* * * * *